Sept. 25, 1945. T. E. MEAD 2,385,521
WORK FEEDING DEVICE
Filed March 25, 1943 2 Sheets-Sheet 1

Inventor:
Theodore E. Mead,
By Dawson, Ooms and Booth,
Attorneys.

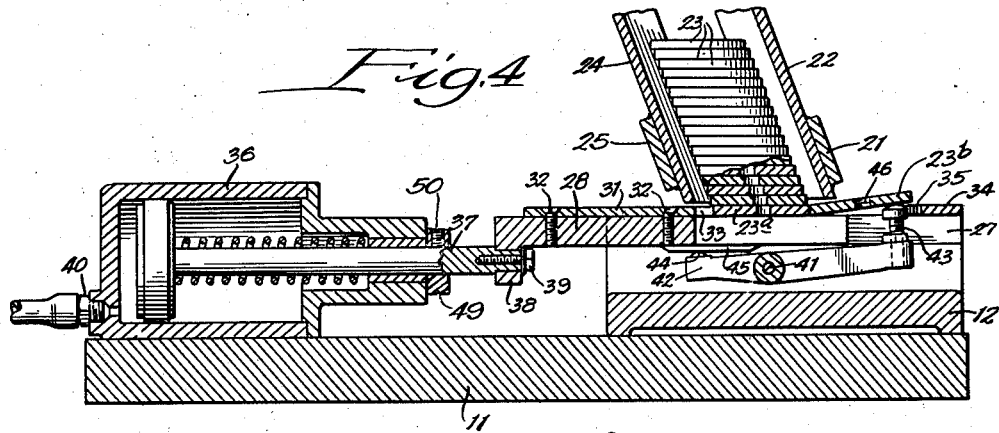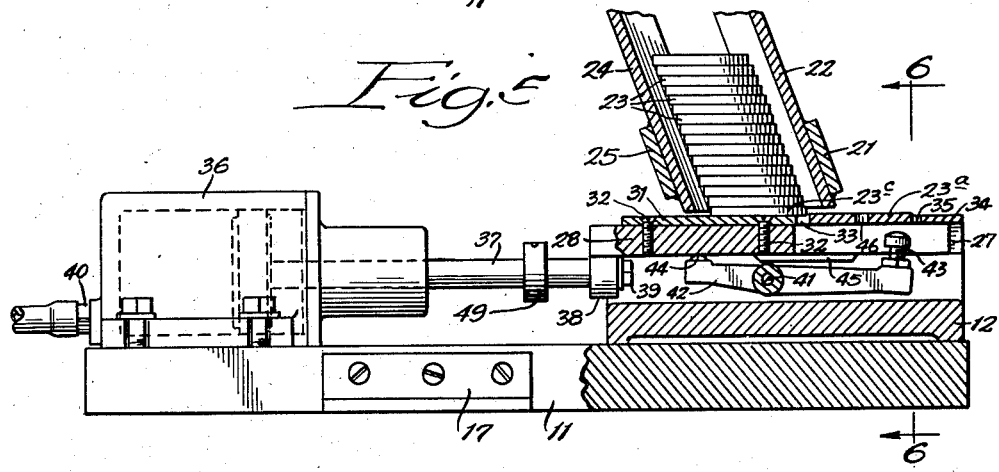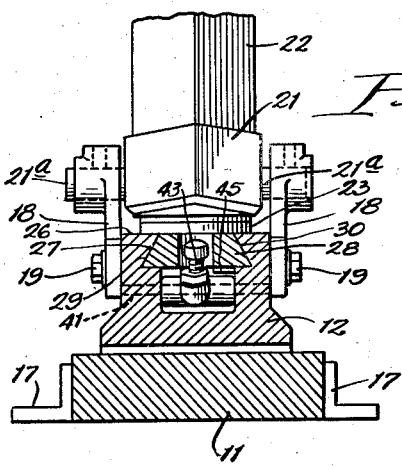

Patented Sept. 25, 1945

2,385,521

UNITED STATES PATENT OFFICE 2,385,521

WORK FEEDING DEVICE

Theodore E. Mead, Wilmette, Ill.

Application March 25, 1943, Serial No. 480,502

10 Claims. (Cl. 10—139)

This invention relates to a work feeding device, and more particularly to a device for automatically feeding work to work-holding position and releasing each piece of work before the next piece of work is advanced.

An object of the invention is to provide a device for successively advancing pieces of work and fixing the pieces of work in work-holding position. Another object is to provide in a work feeding device, mechanism which may be adjusted to accommodate different sizes and shapes of work and to provide a magazine which is adjustable to support such pieces of work and means for adjusting the advancing mechanism and the jaws for securing the work in work-holding position. Yet another object is to provide mechanism for automatically releasing the pieces of work from work-holding position in the operation of the device for advancing the next piece of work. A further object is to provide in a work feeding device, equipped with means for releasing a piece of work, adjustable means for releasing pieces of work of different sizes and shapes.

Another object of the invention is to provide a device in which pieces of work may be supported in vertically-stacked relation and are successively advanced to work-holding position, mechanism being provided for releasing each piece of work from work-holding position when the next piece is advanced to this position.

Other features and advantages will appear from the following specification and drawings, in which—

Figure 1:
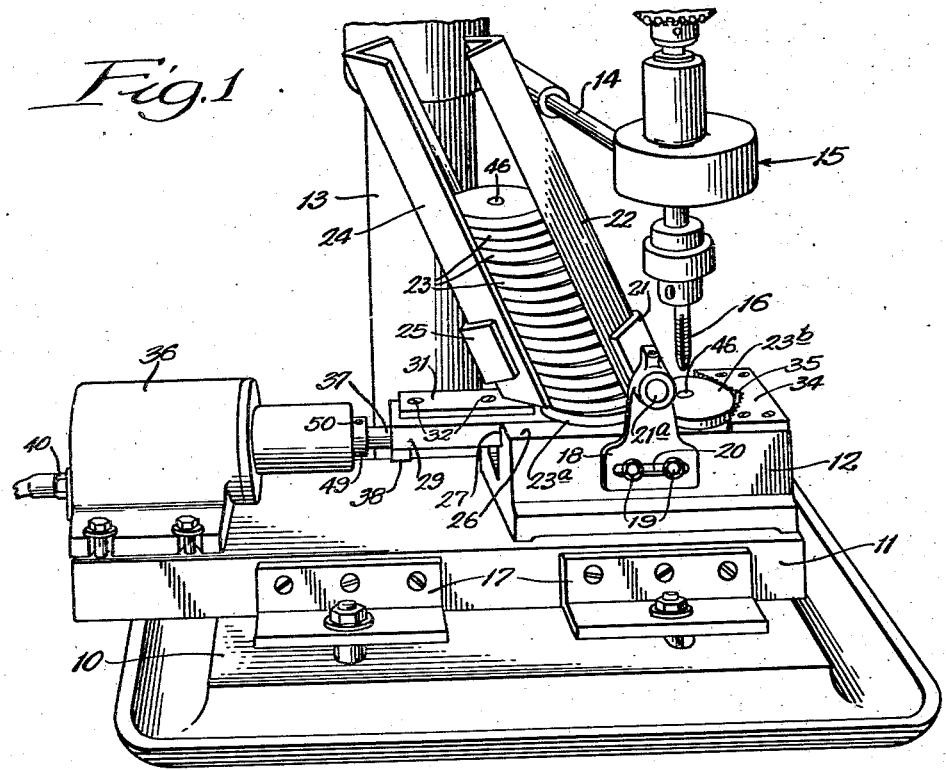
Figure 2:
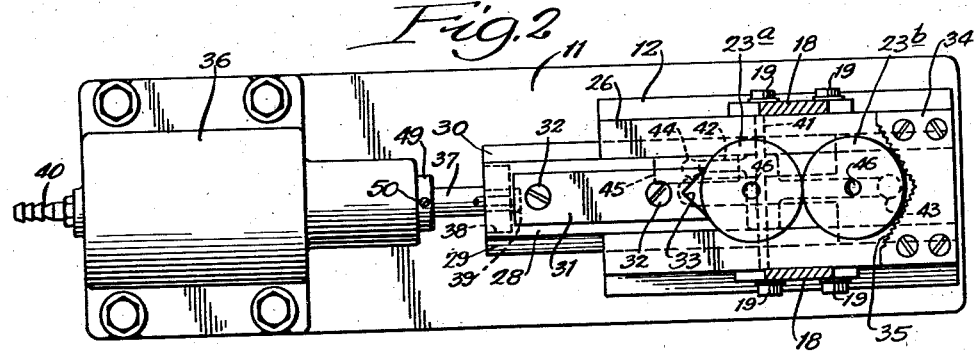
Figure 3:
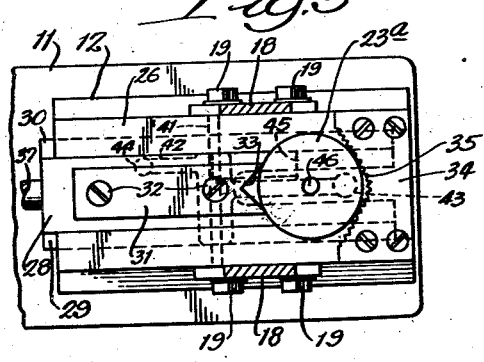

Fig. 1 is a perspective view of an embodiment of the device of the invention; Fig. 2 is a plan view of the mechanism for advancing the work to work-holding position; Fig. 3 is a fragmentary plan view similar to Fig. 2 but showing the work secured in work-holding position; Fig. 4 is a sectional view of the advancing and releasing mechanism; Fig. 5 is a side elevational view, partly in section, of the portion of the device shown in Fig. 4 and showing the advancing mechanism in forward position; and Fig. 6 is a vertical sectional view taken along the line 6—6 of Fig. 5.

The invention contemplates receiving a plurality of thin flat pieces of work in vertically-stacked relation and advancing the lowermost of such pieces to work-holding position. The advancing mechanism serves to fix the piece in work-holding position while the operations are performed on it. Thereafter, as the advancing mechanism is retracted, the piece of work is tilted and as the next piece of work is advanced, the first piece of work is urged from work-holding position.

An embodiment of the invention is illustrated herein in connection with a conventional drill press. The drill press is equipped with a table 10 which supports the base 11 of the work feeding device. A bed 12 mounted on the base 11 supports the mechanism for advancing and holding the work.

A standard 13 of suitable or conventional design supports by an arm 14, or any other desired means, a tapping attachment 15 or other operative mechanism of the drill press. As illustrated in Fig. 1, the mechanism includes a tap 16 which is adapted to be applied to the work. A flange 17 on the base 11 may be used to secure the base to the table 10 of the press.

A bracket 18 is mounted on the bed 12 by means of the bolts 19 which are received in the slot 20 in the bracket, and thus support the bracket on the bed. By reason of the slot 20, the position of the bracket may be adjusted so as to move the same along the bed 12. The bracket 18 pivotally receives a shaft 21ª which carries an angular member 21 for supporting a wall 22 for engaging the pieces of work 23. The member 21 and wall 22 carried thereby are pivotally movable about the shaft or trunnion 21ª. In addition, the shaft 21ª is movable longitudinally within the bracket 18. A similar wall 24 is supported in laterally-spaced relation with respect to the wall 22 so as to engage the opposite sides of the pieces of work 23. The wall 24 is supported by the angular member 25. The angular member 25 is supported by a bracket (not shown) which is of the same construction as the bracket 18 on the opposite side of the bed 12. The walls 22 and 24 provide a magazine or hopper within which the pieces of work are received in vertically-stacked relation.

The upper surface 26 of the bed 12 is preferably flat so as to receive and support the lowermost piece of work 23ª in the magazine or hopper. The bed 12 is provided with central longitudinal grooves 27 within which is received a slide 28, the slide being mounted for longitudinal slidable movement within the grooves. Preferably, the side walls of the grooves 27 taper outwardly and downwardly and are engaged in complementary relation by the side walls 29 and 30 of the slide so as to provide a dove-tail construction, preventing vertical movement of the slide in the groove.

A plate member 31 may be secured to the slide 28 by screws 32. If desired, the slide may be provided with a plurality of holes through which the screws may extend so as to permit of longitudinal adjustment of the plate 31 with respect to the slide 28. However, as shown, the screws 32 threadedly engage the slide 28. The forward end of the plate 31 forms a jaw 33 for engaging one side of the piece of work 23a.

The upper surface of the bed 12 also supports a jaw 34 for engaging one side of the piece of work in work-holding position. The engaging surface of the jaw may be in the shape of a broad V and may be equipped with a serrated surface 35 for firmly engaging the work.

A suitable reciprocating mechanism 36 may be mounted on the base 11, with the plunger 37 of the mechanism 36 extending forwardly and secured to a depending lug 38 on the slide 28 by means of the bolt 39. Any suitable reciprocating mechanism may be used. For example, as shown, a device actuated by compressed air introduced through the inlet 40 and providing longitudinal reciprocating movement of the plunger 37, may be used. The reciprocating device 36 may be manually-controlled or, if desired, may be automatic so as to provide for reciprocation of the plunger 37 at spaced intervals of time. Since any suitable reciprocating mechanism 36 may be used, the construction of the mechanism is not set forth in detail herein.

The plunger may be provided with a collar 49 which is longitudinally slidable thereon. A set screw 50 in the collar serves to secure the collar to any desired portion of the plunger. The collar serves the purpose of limiting the rearward movement of the plunger 37 and by reason of its adjustability on the plunger 37 may be used to limit the rearward movement of the plunger at any desired portion of the stroke.

The bed 12 supports a pivot 41 which provides a pivotal mounting for a rocker arm 42. The forward end of the rocker arm is equipped with an upwardly-extending pin 43 which threadedly engages the end of the rocker arm and may be adjusted vertically with respect thereto. The other end of the rocker arm may be equipped with a pin 44 for engaging a cam 45 carried by the slide 28. The cam may consist of a thin enlargement depending from the lower surface of the slide 28 adapted to engage the pin 44 when the slide 28 is in retracted position. The pin 43 on the forward end of the rocker arm is disposed beneath the forward side of the piece of work 23b which is received in work-holding position.

As seen particularly in Figs. 2 to 5, the jaw 33 of the plate member 32 engages the rear side of the work 23a as the slide 28 and plate 31 carried thereby are advanced. Thus, when the reciprocating device 36 advances the plunger 37 and the slide 28 secured thereto, the jaw 33 engages the rear side of the work 23a. This position is shown in Figs. 2 and 4. In this position, the cam 45 on the lower surface of the slide 28 is in engagement with the pin 44, and the pin 43 at the forward end of the rocker arm engages the forward side of the piece of work 23b in work-holding position. The forward side of this piece of work is lifted above the level of the jaw 34, as seen in Fig. 4.

As the plunger 37, slide 28 and plate 31 are advanced from the position shown in Figs. 2 and 4, the piece of work 23a is advanced along the surface of the bed 12 toward work-holding position, and the piece of work 23b is urged upwardly and forwardly across the upper surface of the jaw 34. The work 23b is thus removed from work-holding position and the next piece of work 23a is advanced to work-holding position.

In Figs. 3 and 5, the piece of work 23a is shown in work-holding position.

As the plunger 37, slide 28 and plate 31 are retracted toward rear position, the cam 45 is brought into engagement with the pin 44 and the pin 43 engages the forward side of the work 23a in work-holding position to tilt the same to the position shown for the work 23b in Fig. 4. At the same time, the next lowermost piece of work 23c falls to a position of engagement with the upper surface of the bed 12 and is ready to be engaged by the jaw 33 on its next forward stroke.

In the operation of the device, a plurality of pieces of work 23 are placed in the magazine or hopper between the walls 22 and 24 in vertically-stacked relation. The reciprocating device 36 is set in operation, and the forward movement of the plunger 37, the slide 28 and plate 31 brings the jaw 33 into engagement with the lowermost piece of work. This piece of work is advanced to the forward position shown for the piece of work 23a in Fig. 3. In this position, the work is engaged and gripped between the jaws 34 and 33. The tap 16 or other tool is then brought downwardly into engagement with the surface of the work, the tap being received within the central aperture 46 in the work. As soon as the tap passes through the work to form the desired threads on the aperture, the tap is withdrawn upwardly, and the device is ready for the next step of the operation.

The reciprocating device 36 is operated to retract the plunger 37 and withdraw the slide 28 and plate 31 to the position shown in Fig. 4. In this position, the pin 43 engages the forward side of the piece of work which is in work-holding position. This position is illustrated in Fig. 4 in which the forward side of the piece of work 23b is engaged, and this piece of work is tilted upwardly so that the forward end thereof extends above the jaw 34. The piece of work 23a, which is lowermost in the stack of pieces in the work holder, rests on the upper surface of the bed 12.

As the plunger 37 moves forwardly, the jaw 33 is brought into engagement with the piece of work 23, which in turn engages the piece of work 23b to urge the same forwardly above the jaw 34. The continuing advance of the slide 28 brings the cam 45 out of engagement with the pin 44 and the pin 43 drops down to the position shown in Fig. 5. At the same time, the piece of work 23a is gripped between the jaw 33 and jaw 34, and this piece of work is thus fixed in work-holding position. The tap 16 or other tool is again brought into contact with the piece of work in work-holding position and then withdrawn therefrom. The mechanism is then ready for the next step of the operation.

With this device, as each work operation is performed, the reciprocating device 36 may be actuated to cause the slide 28 and plate 31 carried thereby to reciprocate, the slide moving rearwardly until the lowermost piece of work in the magazine falls into engagement with the upper surface of the bed. At the same time, the forward side of the first piece of work which is in work-holding position is tilted upwardly. The plunger 37, slide 28 and plate 31 then move forwardly to remove the first piece of work and at the same time advance the second piece of work to work-holding position.

The device may be used with pieces of work of any suitable size or shape. Preferably, the device is used with disks of the type illustrated in the drawings. However, the construction of the magazine and the jaws may be varied to accommodate different peripheral shapes for the pieces of work. The magazine and the jaws may be adjusted so as to accommodate pieces of work of different diameters. The mechanism is also suitable for operation with pieces of work of different thicknesses. Preferably, the thickness of the work is less than the diameter of the same between the jaws so that the tilting mechanism provided by the rocker arm can operate at maximum effectiveness. The pin 43 is vertically adjustable in the rocker arm so as to compensate for pieces of work of different thicknesses.

Although the work feeding device has been illustrated in connection with a drill press, the device may be used with any suitable mechanism and the work in work-holding position may be subjected to any desired tool operations.

Although the invention has been described in connection with a specific embodiment, it will be apparent that modifications and changes may be made without departing from the spirit and scope of the invention.

I claim:

1. A work feeding device comprising means for supporting a plurality of pieces of work in vertically-stacked relation, reciprocating mechanism for successively advancing said pieces of work to work-holding position, means for engaging pieces of work to secure the same in said position, said means including said mechanism and a jaw on the opposite side of the work from said mechanism, and means actuated by said mechanism for removing each piece of work from said position as the next piece of work is advanced thereto.

2. A work feeding device comprising means for supporting a plurality of pieces of work in vertically-stacked relation, a pair of jaws for engaging a piece of work in work-holding position, said jaws being on opposite sides of the piece of work when it is in work-holding position, means for reciprocating one of said jaws with respect to the other to successively advance pieces of work to work-holding position, and means actuated by said reciprocating means for releasing each piece of work from said position.

3. A work feeding device comprising a bed, a magazine mounted on said bed for presenting successively a plurality of pieces of work, a slide mounted in said bed for reciprocating movement and equipped with a jaw at the forward end thereof for engaging the lowermost piece of work in said magazine, actuating means for imparting reciprocating movement to said slide, the jaw on said slide on the forward stroke thereof moving the lowermost piece of work forwardly into work-holding position, a jaw carried by said bed and disposed in spaced relation with respect to the jaw on said slide whereby, when the jaw on the slide is in forward position, the work is supported in work-holding position between said jaws, said jaws being on opposite sides of the piece of work when it is in work-holding position, and means actuated by the reciprocation of said slide for releasing each piece of work from work-holding position.

4. A work feeding device comprising a bed, a magazine mounted on said bed for supporting a plurality of pieces of work in vertically-stacked relation, said pieces being substantially flat and being of a thickness less than the diameter thereof, a slide mounted in said bed for reciprocating movement and equipped with a jaw at the forward end thereof for engaging the lowermost piece of work in said magazine, reciprocating mechanism for imparting reciprocating movement to said slide, the jaw on the slide engaging the lowermost piece of work to move the same forwardly and to work-holding position on the forward stroke of the slide, a jaw carried by said bed and disposed opposite said slide jaw whereby when the slide jaw is moved to forward position the work is supported in work-holding position between said jaws, a cam carried by said slide, and means for tilting the forward side of the piece of work in work-holding position upwardly above the jaw on said bed when the slide is moved to rear position, said tilting means being actuated by said cam.

5. A work feeding device comprising a bed, a magazine mounted on said bed for supporting a plurality of pieces of work in vertically-stacked relation, said pieces being substantially flat and being of a thickness less than the diameter thereof, a slide mounted in said bed for reciprocating movement and equipped with a jaw for engaging the rear side of the lowermost piece of work in said magazine, reciprocating means engaging said slide for imparting reciprocating movement thereto, said jaw on the forward stroke of the slide engaging the lowermost work piece to move the same forwardly into work-holding position, a jaw carried by the bed and disposed in spaced relation with respect to the slide jaw whereby when the jaw on the slide is in forward position the work is supported in work-holding position between said jaws, a cam carried by said slide, a rocker arm mounted in adjacent relation to said slide and provided with means engaged by said cam for shifting the position of the rocker arm when the slide is retracted from forward position, and means carried by the rocker arm for engaging the forward side of the piece of work in work-holding position to tilt the same when the position of the rocker arm is shifted.

6. A work feeding device comprising a bed, a magazine mounted on said bed for supporting a plurality of pieces of work in vertically-stacked relation, the magazine being adjustable to accommodate pieces of different widths and different shapes, a slide mounted in said bed for reciprocating movement and equipped with a jaw for engaging the lowermost piece of work in said magazine, reciprocating mechanism engaging said slide for imparting reciprocating movement thereto, the slide jaw on the forward stroke of the slide moving the lowermost piece of work forwardly into work-holding position, a jaw carried by said bed and disposed opposite said slide jaw whereby when the slide jaw is moved to forward position the work is supported in work-holding position between said jaws, and means actuated by the reciprocation of said slide for releasing said piece of work from work-holding position.

7. A work feeding device comprising a bed, a magazine mounted on the bed for supporting a plurality of pieces of work in vertically-stacked relation, said pieces being substantially flat and being of a thickness less than the diameter thereof, a slide mounted in said bed for reciprocating movement and equipped with a jaw for engaging the lowermost piece of work in said magazine, reciprocating mechanism engaging said slide for imparting reciprocating movement thereto, a jaw carried by said bed and disposed in laterally-spaced relation with respect to the slide jaw, said slide jaw on the forward stroke of the slide moving the lowermost piece of work forwardly into work-holding position wherein the work is supported between said jaws, a cam carried by said slide, a rocker arm mounted in adjacent relation to said slide and equipped with means adapted to be engaged by said cam fo shifting the position of said rocker arm when the slide is retracted from forward position, vertically-adjustable means carried by the rocker arm for engaging the lower surface of the forward side of a piece of work in work-holding position to tilt the forward side of the work above the bed jaw when said slide is retracted and the position of said rocker arm is shifted.

8. A work feeding device comprising means for supporting a plurality of piece of work in vertically-stacked relation, a pair of jaws, and means for moving one of said jaws with respect to said first-mentioned means to remove a piece of work therefrom and advance it into work-holding position, said last-mentioned means being effective for pressing said one jaw toward the other jaw so as to grip said piece in work-holding position therebetween, said jaws being on opposite sides of the piece of work when it is in work-holding position.

9. A work feeding device comprising means for supporting a plurality of pieces of work in vertically-stacked relation, a pair of jaws, and reciprocating means actuated by air pressure for moving one of said jaws with respect to said first-mentioned means to remove a piece of work therefrom and advance it into work-holding position, said last-mentioned means being effective for pressing said one jaw toward the other jaw so as to grip said piece in work-holding position therebetween, said last-mentioned means being adapted to move said one jaw away from said other jaw upon release of air pressure thereto to thereby release said work piece from gripping relation between said jaws, said jaws being on opposite sides of a piece of work when it is in work-holding position.

10. A device as set forth in claim 9 wherein said jaws have V-shaped engaging surfaces.

THEODORE E. MEAD.